United States Patent
Graefe et al.

(10) Patent No.: US 10,929,399 B2
(45) Date of Patent: *Feb. 23, 2021

(54) DATABASE SYSTEM TESTING USING ROBUSTNESS MAPS

(75) Inventors: Goetz Graefe, Madison, WI (US); Harumi Kuno, Cupertino, CA (US); Janet L. Wiener, Palo Alto, CA (US)

(73) Assignee: Micro Focus LLC, Santa Clara, CA (US)

( * ) Notice: Subject to any disclaimer, the term of this patent is extended or adjusted under 35 U.S.C. 154(b) by 1361 days.

This patent is subject to a terminal disclaimer.

(21) Appl. No.: 12/364,170

(22) Filed: Feb. 2, 2009

(65) Prior Publication Data

US 2010/0198809 A1   Aug. 5, 2010

(51) Int. Cl.
*G06F 16/245* (2019.01)
*G06F 16/2453* (2019.01)

(52) U.S. Cl.
CPC .............................. *G06F 16/24549* (2019.01)

(58) Field of Classification Search
CPC .................................................... G06F 11/3692
USPC .......................................................... 707/720
See application file for complete search history.

(56) References Cited

U.S. PATENT DOCUMENTS

| | | | | |
|---|---|---|---|---|
| 6,049,798 A | * | 4/2000 | Bishop | G06F 11/3495 |
| 7,185,000 B1 | * | 2/2007 | Brown | G06F 17/30433 707/718 |
| 7,657,501 B1 | * | 2/2010 | Brown et al. | 707/999.002 |
| 8,015,454 B1 | * | 9/2011 | Harrison | G06F 11/3409 714/47.3 |
| 8,069,240 B1 | * | 11/2011 | Ybarra, III | H04L 41/5016 709/224 |
| 2003/0177137 A1 | | 9/2003 | MacLeod et al. | |
| 2003/0182276 A1 | * | 9/2003 | Bossman | G06F 17/30306 |
| 2004/0044662 A1 | * | 3/2004 | Ganesan | G06F 17/30439 |
| 2005/0222965 A1 | | 10/2005 | Chaudhuri et al. | |
| 2006/0106851 A1 | * | 5/2006 | Warshawsky | 707/101 |
| 2006/0190310 A1 | | 8/2006 | Gudla et al. | |
| 2006/0200451 A1 | | 9/2006 | Kosuru et al. | |
| 2007/0005297 A1 | * | 1/2007 | Beresniewicz et al. | 702/181 |
| 2007/0143246 A1 | | 6/2007 | Bestgen et al. | |
| 2008/0133454 A1 | * | 6/2008 | Markl | G06F 17/30457 |

(Continued)

OTHER PUBLICATIONS

Atwood, Not All Bugs Are Worth Fixing, Jan. 29, 2006.*

(Continued)

*Primary Examiner* — Brittany N Allen

(57) ABSTRACT

Computer-implemented systems and associated operating methods take measurements and landmarks associated with robustness maps and perform tests evaluating the robustness of a database engine's operator implementations and/or query components. The illustrative computer-implemented system comprises logic that receives one or more robustness maps of measured database system performance acquired during database execution in a predetermined range of runtime conditions and uses information from the robustness map or maps to perform regression testing wherein landmarks in the robustness maps are operated upon as a robustness bugs describing conditions under which a predetermined implementation of a database operator or query component degrades in a manner different from a predetermined expected manner.

20 Claims, 18 Drawing Sheets

(56) References Cited

U.S. PATENT DOCUMENTS

2009/0077013 A1* 3/2009 Hu et al. ............................ 707/2
2010/0185961 A1* 7/2010 Fisher et al. .................. 715/760

OTHER PUBLICATIONS

Becker et al., Strike it Rich, Teradata magazine, Dec. 2007.*
Sink, My life as a Code Economist, Nov. 11, 2005.*
SQL Performance Analyzer, An Oracle white paper, Nov. 2007.*
Walcott, Prioritizing Regression Test Suites for Time-Constrained Execution Using a Genetic Algorithm, 2005.*

* cited by examiner

| MAP ID | BUG IDENTIFIER | RESOURCE COORDINATE | DATA COORDINATE | OPERATOR OR QUERY ID | SEVERITY (DEGRADATION DEPTH, WIDTH, LENGTH) | EXPECTED FREQUENCY OF BUG |
|---|---|---|---|---|---|---|
| tableScan memory input | Cliff-000 | Avg. available memory: 10-32 GB | Input size: 210 GB | Table Scan | 2300 rows/sec | Expected |
| INLJ CPU, Input Selectivity | Sinkhole-001 | Avg. CPU load: 90% | Input size: 50,000, 2500 rows; selectivity 20% | Index Nested Loops Join | 1200 rows/sec | 10% |

FIG. 5

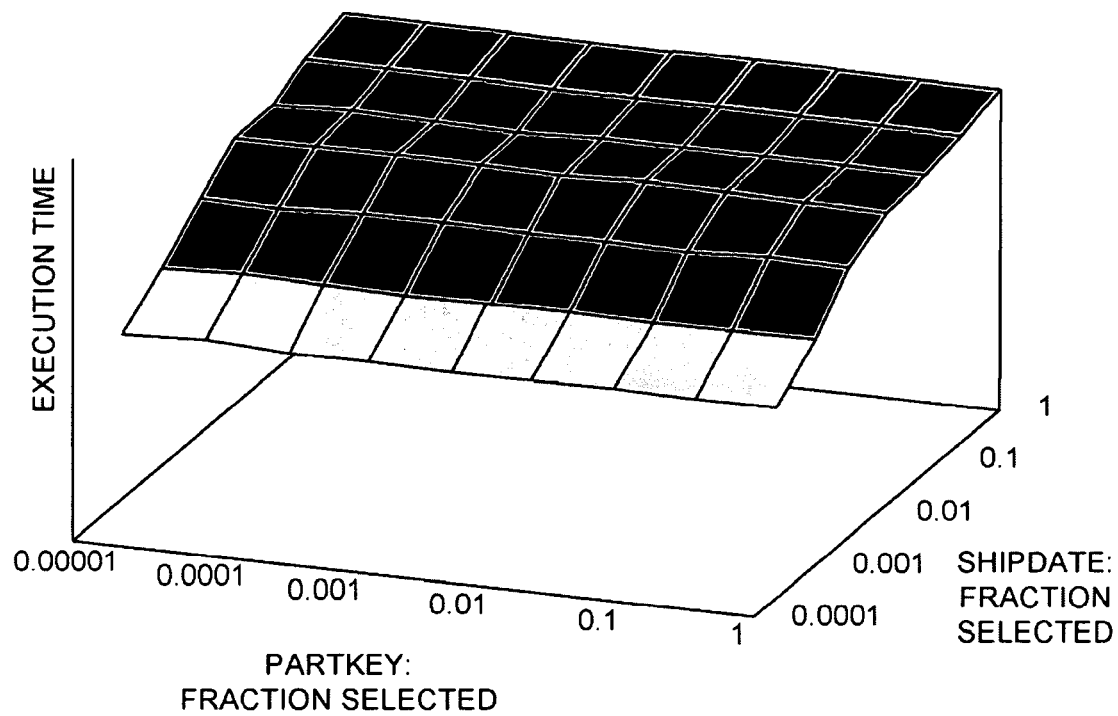
FIG. 6K(1)
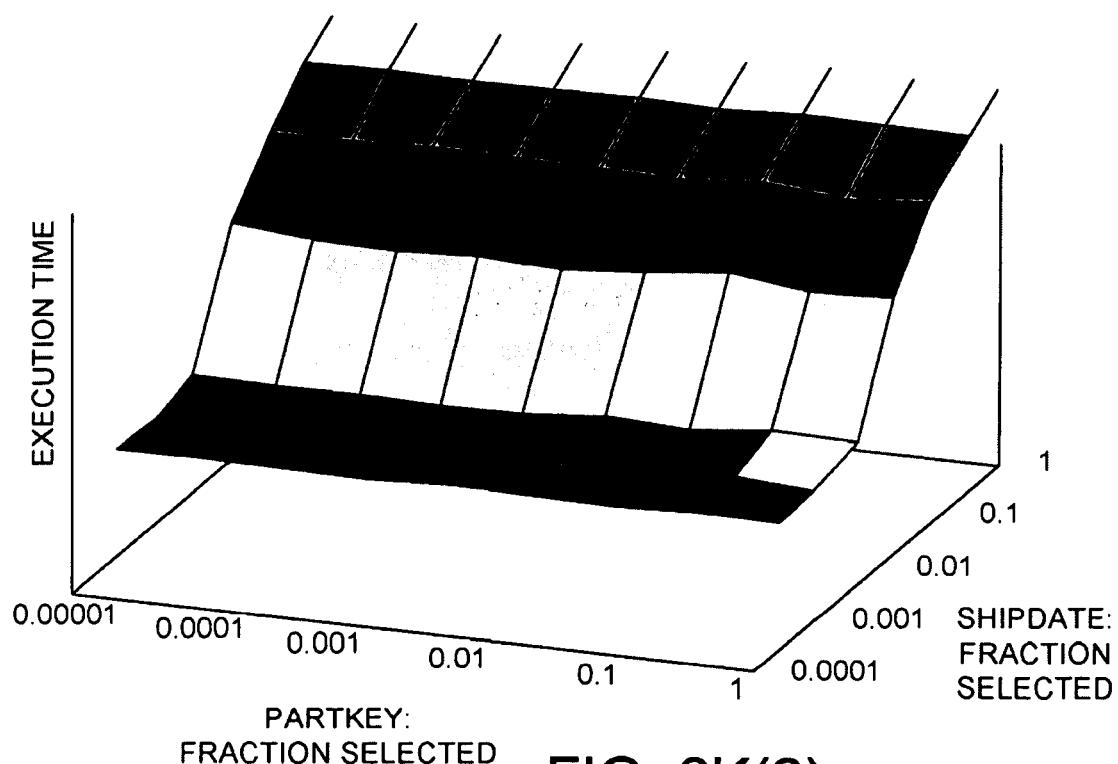
FIG. 6K(2)

DATABASE SYSTEM TESTING USING ROBUSTNESS MAPS

BACKGROUND

A query statement can be compiled into a query plan consisting of query operators. A query operator can be executed in many different ways, for example full table scans, index scans, nested loop joins, hash joins, and others. A query optimizer is a component of a database management system that attempts to determine the most efficient way to execute a query. The query optimizer determines the most efficient way to execute a SQL statement after considering many factors related to the objects referenced and the conditions specified in the query. The determination is a useful step in the processing of any query statement and can greatly affect execution time.

The query optimizer compares the available query plans for a target input query and estimates which of plan will be the most efficient in practice. One type of query optimizer operates on a cost basis and assigns an estimated cost to each possible query plan, for example selecting the plan with the smallest cost. Costs can be used to estimate the runtime cost of evaluating the query in terms of factors such as the number of I/O operations required, processor load requirements, and other factors which can be set forth in a data structure called a data dictionary which stores statistics used by the query optimizer. The set of available query plans that are examined is formed by examining the possible access paths, such as index scan and sequential scan, and join algorithms including sort-merge join, hash join, nested loops, and others. A search space can become very large according to complexity of the query.

Performance of a database system during processing of a query depends on the ability of a query optimizer to select an appropriate plan for executing the query under an expected set of conditions (for example, cardinality estimates, resource availability assumptions), and the ability of an executor to process the query using the selected plan under actual runtime conditions.

Some approaches to managing database system performance focus on the query optimizer's ability to select an appropriate plan. Even techniques that consider the disparity between expected and actual runtime conditions focus on assisting the query optimizer to pick the best plan with regard to such disparity.

SUMMARY

Embodiments of computer-implemented systems and associated operating methods take measurements and landmarks associated with robustness maps and perform tests evaluating the robustness of a database engine's operator implementations and/or query components. The illustrative computer-implemented system comprises logic that receives one or more robustness maps of measured database system performance acquired during database execution in a predetermined range of runtime conditions and uses information from the robustness map or maps to perform regression testing wherein landmarks in the robustness maps are operated upon as a robustness bugs describing conditions under which a predetermined implementation of a database operator or query component degrades in a manner different from a predetermined expected manner.

BRIEF DESCRIPTION OF THE DRAWINGS

Embodiments of the invention relating to both structure and method of operation may best be understood by referring to the following description and accompanying drawings:

FIG. 5 is a table showing an example list of possible robustness bugs in an embodiment of a test system; and FIGS. 6A through 6M are pictorial diagrams showing maps of performance under specific runtime conditions.

DETAILED DESCRIPTION

A system tests robustness of a database system.

In an illustrative embodiment, a system tests robustness of a database system implementation with regard to a variety of conditions that include resource availability and data characteristics. The system enables tests to be carried out more quickly without loss of coverage. The system can implement a method for comparing between two robustness maps, for example identifying when "dangerous landmarks" change in significant ways (move, disappear, appear). The system can also implement a method for comparing two or more robustness maps produced by two different database systems, for example to identify which system's maps have more "dangerous landmarks" and comparative locations. The system evaluates a database system's robustness in terms of the number and locations of the landmark features on robustness maps for the database system.

In various embodiments and applications, performance or robustness maps can be created and used to evaluate the robustness of a given database system implementation in terms of the degree of robustness exhibited when executing a known database benchmark.

In various embodiments and applications, measurements and landmarks produced in creation of performance or robustness maps enable production of a system for performing regression tests which evaluate the robustness of a database engine's operator implementations.

In various embodiments and applications, robustness of a given database system implementation can be evaluated in terms of the robustness of operator implementations of the implementation. Systems and operating methods disclosed herein can use performance or robustness maps to perform testing of a database system.

The systems and methods disclosed herein are enabled by recognition that expected conditions often bear little resemblance to actual conditions. These systems and methods thus focus on characterizing, evaluating, and capturing the impact of adverse conditions on the Executor's performance in performance maps, which may be called robustness maps. The maps graphically identify and characterize performance under specific runtime conditions, coordinates of landmarks on the maps, marked regions of interest on the maps, and coordinates of landmarks of interest that fall within the regions of interest.

By creating maps of performance under a large range of conditions, the disclosed systems and method enable the analysis, prediction, and characterization of performance and performance degradation. The maps can be created using time as a measurement of performance, or others of a multitude of performance characteristics, for example including execution time, elapsed (wall clock) time, number of I/O's generated, and the like. In various graphical visualizations, data input characterizations can be presented in different way, for example including cardinality, selectivity, average temporary data size, and the like.

Figure 1:
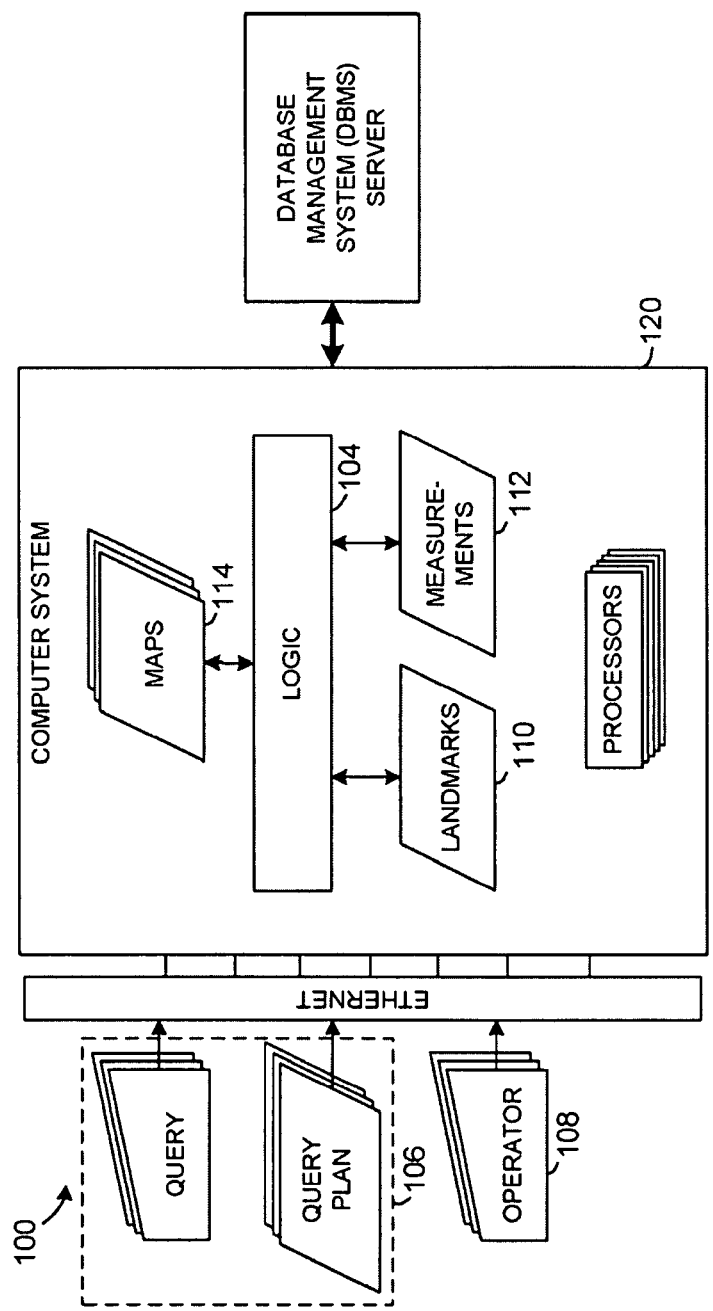
FIG. 1 is a schematic block diagram showing an embodiment of a computer-implemented system that takes measurements and landmarks associated with robustness maps and performs tests evaluating the robustness of a database engine's operator implementations and/or query components.

Referring to FIG. 1, a schematic block diagram illustrates an embodiment of a computer-implemented system 100 that takes measurements 112 and landmarks 110 associated with robustness maps 114 and performs tests evaluating the robustness of a database engine's operator implementations 108 and/or query components 106. The illustrative computer-implemented system 100 comprises logic 104 that receives one or more robustness maps 114 of measured database system performance acquired during database execution in a predetermined range of runtime conditions and uses information from the robustness map or maps 114 to perform regression testing wherein landmarks 110 in the robustness maps 114 are operated upon as a robustness bugs 110 describing conditions under which a predetermined implementation of a database operator 108 or query component 106 degrades in a manner different from a predetermined expected manner. Regression testing is system testing which attempts to discover regressions that occur when functionality that previously operated correctly stops working as intended. Robustness maps 114 are highly suitable for regression testing since the maps enable visualization of a very large number of parameters and variables in a single view. Effective regression tests generate sufficient execution coverage to exercise all meaningful code branches. Therefore, the combinatorial problem inherent in regression testing is effectively addressed with a multiple-dimensional robustness map.

The logic 104 can perform analysis which characterizes the severity of individual robustness bugs 110 in terms of amplitude of the degradation, range of condition span for which the robustness bug 110 is present, and frequency with which robustness bug conditions are historically encountered or expected to be encountered.

The logic 104 can also characterize severity of individual robustness bugs in terms of degree to which the degradation can be remedied, estimation of the resources expended to correct the robustness bug, and assessment of risk associated with an action that corrects the robustness bug.

In some embodiments, the computer-implemented system 100 can further comprise a computer 120 that executes the logic 104.

Figure 2:
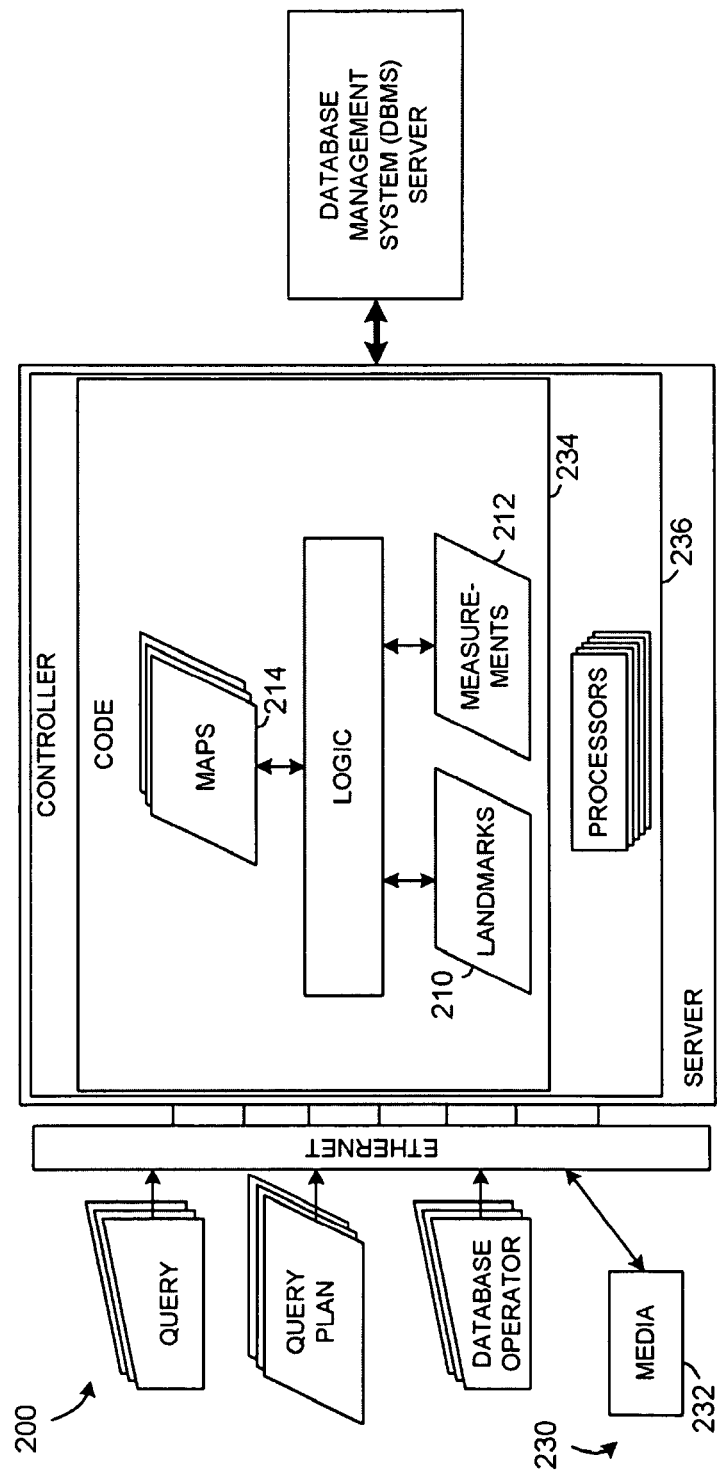
FIG. 2 is a schematic block diagram which depicts an embodiment of a computer-implemented system in the form of an article of manufacture that uses measurements and landmarks associated with robustness maps to perform tests evaluating the robustness of a database engine's operator implementations and/or query components.

Referring to FIG. 2, a schematic block diagram illustrates an embodiment of a computer-implemented system 200 in the form of an article of manufacture 230 that uses measurements 212 and landmarks 210 associated with robustness maps 214 to perform tests evaluating the robustness of a database engine's operator implementations and/or query components. The article of manufacture 230 comprises a controller-usable medium 232 having a computer readable program code 234 embodied in a controller 236 for testing database system performance. The computer readable program code 234 further comprises code causing the controller 236 to receive one or more robustness maps 214 of measured database system performance acquired during database execution in a predetermined range of runtime conditions. The computer readable program code 234 further comprises code causing the controller 236 to test performance based on locations and migrations of landmarks 210 on the robustness map or maps 214.

Figure 3:
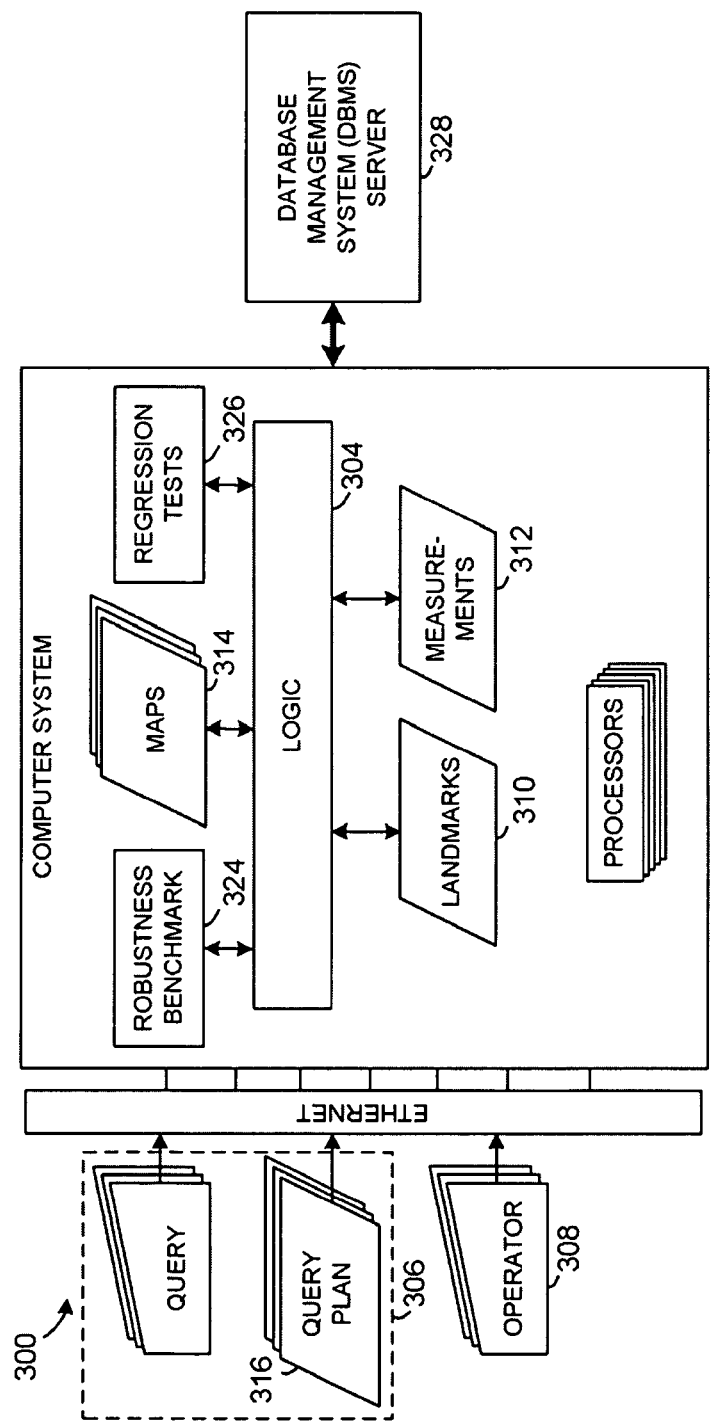
FIG. 3 is a schematic block diagram illustrating an embodiment of a computer-implemented system that evaluates robustness of a given database system implementation in terms of the robustness of operator implementations and query components of the database system.

Referring to FIG. 3, a schematic block diagram illustrates an embodiment of a computer-implemented system 300 that evaluates robustness of a given database system implementation in terms of the robustness of operator implementations 308 and query components 306 of the database system 328. The computer-implemented system 300 comprises logic 304 that receives one or more robustness maps 314 of measured database system performance acquired during database execution in a predetermined range of runtime conditions and tests performance based on locations and migrations of landmarks 310 on the one or more robustness maps 314.

The logic 304 can evaluate robustness of a specified database system implementation in terms of degree of robustness exhibited when executing a predetermined database benchmark 324. The robustness benchmark 324 enables robustness of a database system to be quantified.

In some implementations or applications, the logic 304 can analyze measurements 312 and landmarks 310 in the robustness map or maps 314, and use the analysis to perform regression tests 326 that evaluate robustness of a database engine's operator implementations 308.

Similarly, in some applications the logic 304 can evaluate robustness of a specified database system implementation 328 in terms of robustness of operator implementations 308.

The logic 304 can test performance by visualizing the location and character of performance changes on the one or more robustness map 314 wherein the robustness map or maps 314 are analyzed to detect circumstances under which performance is sensitive to deviations from expected behavior. Based on the analysis, the logic 304 identifies performance anomalies.

The logic 304 can detect performance degradation by determining curvature between data points on the robustness map or maps 314, for example by identifying locations on the robustness maps 314 wherein performance degrades by a predetermined amount or performance degrades in a manner different from a predetermined expected manner. The logic 304 can apply a corrective action based on the amount of detected performance degradation.

The logic can use robustness maps 314 to compare performance of an applied query plan and/or operator to a best known query plan 316 and/or operator 308. The logic 304 can apply a corrective action based on the detected performance comparison.

The logic 304 can use robustness maps 314 to detect an error condition where performance improves as workload increases or operating resources decrease.

Figure 4A:
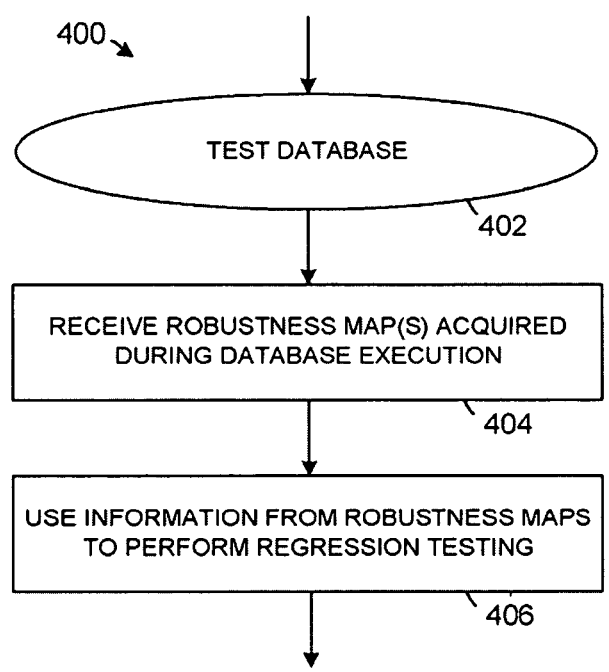
FIGS. 4A and 4B are flow charts that show one or more embodiments or aspects of a computer-executed method for evaluating robustness of a given database system implementation in terms of the robustness of its operator implementations.
Figure 4B:
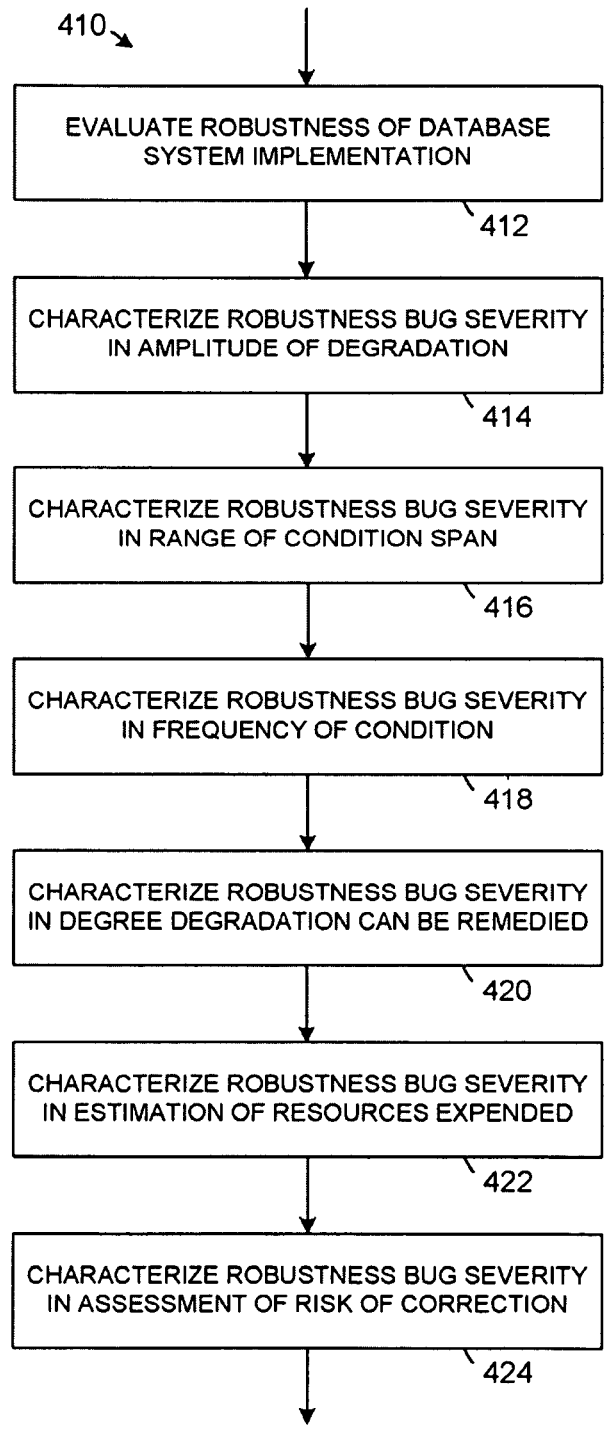

Referring to FIGS. 4A and 4B, flow charts illustrate one or more embodiments or aspects of a computer-executed method for evaluating robustness of a given database system implementation in terms of the robustness of its operator implementations. FIG. 4A depicts a computer-executed method 400 for testing 402 a database system that comprises receiving 404 one or more robustness maps of measured database system performance acquired during database execution in a predetermined range of runtime conditions, and using 406 information from the robustness maps to perform regression testing wherein landmarks are operated upon as a robustness bug describing conditions under which a predetermined implementation of a database operator or query component degrades in a manner different from a predetermined expected manner.

Referring to FIG. 4B, a method 410 for evaluating 412 robustness of the database system implementation can comprise characterizing severity 414 of individual robustness bugs in terms of amplitude of the degradation, range of condition span 416 for which the robustness bug is present, frequency 418 with which robustness bug conditions are historically encountered or expected to be encountered, degree 420 to which the degradation can be remedied, estimation 422 of the resources expended to correct the robustness bug, assessment 424 of risk associated with an action that corrects the robustness bug, and other conditions or aspects of operation.

In contrast to the illustrative systems 100, 200, and 300, and methods 400 and 410, traditional solutions do not consider the impact of variable runtime conditions, such as resource availability, and do not systematically gather actual performance measurements over a variety of runtime conditions. Furthermore, traditional solutions focus on the selection of optimal query plans for a small range expected conditions, as opposed to the evaluation of database operators under a wide variety of actual conditions.

For example, Harista et al. (U.S. Publication No. 2002/0046030) discloses a system that maps how well queries perform relative to one another in terms of estimated (expected) performance in ranges of the selectivity of a simple single-operator query with up to two parameters. Because the goal in Harista et al. is to reduce the number of plans in the query optimizer's plan search space, actual performance is not modeled and the impact of other conditions such as resource availability is not considered.

Database regression tests may test the performance of individual operators, sometimes under specific resource availability conditions, but do not evaluate performance across a spectrum of conditions and do not consider performance as a continuous function across a spectrum of conditions. Database regression tests are used to evaluate performance—results are not stored nor later used to calculate an estimate for a specific query's performance under specific conditions.

The illustrative systems 100, 200, and 300 can perform regression tests that include analysis of robustness maps, focusing on the areas where small changes have disproportionally big impact on performance. The systems enable tests to be carried out more quickly without loss of coverage, and can also identify when the "dangerous landmarks" change in significant ways (move, disappear, appear).

Database physical design advisors evaluate physical design search spaces, often with regard to specific query plans or atomic query plans, but the evaluations do not consider a variety of runtime conditions (for example, resource availability). Furthermore, database physical design advisor comparisons are based completely on query optimizer cost estimates, as opposed to actual performance measurements of the systems 100, 200, and 300 depicted in FIGS. 1, 2, and 3.

Given a set of robustness maps, each landmark can be treated as a robustness bug which describes conditions under which a specific implementation of a database operator or atomic query component suddenly degrades (as opposed to a graceful degradation).

The severity of each robustness bug is then characterized in terms of the depth of the degradation, the range of conditions that the bug spans, the frequency with which the conditions have been historically encountered (or are expected to be encountered), the degree to which the degradation can be remedied, an estimation of the resources allocated to fix the bug, an assessment of the risk associated with the proposed fix, and the like.

Referring to FIG. 5, a table shows an example list of possible robustness bugs in an embodiment of a test system. The systems and methods disclosed herein use information about robustness bugs such as those listed to evaluate results of database tests.

The graphs shown in FIGS. 6A through 6M, various embodiments or visualizations of robustness maps enable a test system that identifies places where performance either drops off dramatically or unexpectedly, or performance becomes substantially worse than a best known operator or plan, depending on the component under analysis. The information in the robustness can be used to determine possible improvements.

The illustrative systems and methods that use robustness maps for testing substantially increase testing capabilities. Conventional tests can test only a few selected conditions. In contrast, the illustrative testing systems and methods enable analysis of how performance degrades under a wide range of conditions, and enables comparison of a particular implementation with best performance.

Figure 6A:
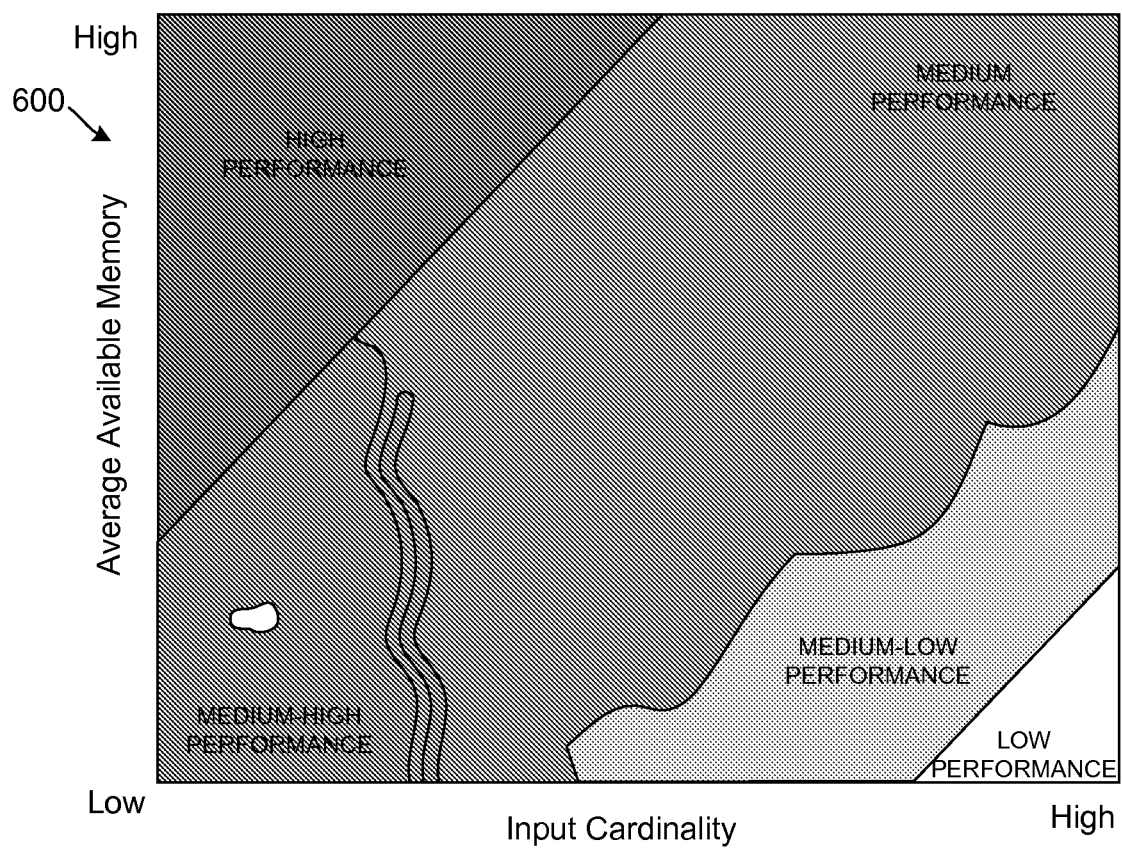

Referring to FIG. 6A, a pictorial diagram shows a hypothetical map of performance under specific runtime conditions for a specific implementation of a database operator on a given system configuration. The X axis shows the number of rows of input that are processed during execution (cardinality). The Y axis represents the maximum amount of memory available to the executor for the subject query during execution. Regions of the map can be color-coded or grayscale-coded according to average throughput under particular available memory/input tuples processed conditions. Darker colors indicate higher throughput. A similar graph can be created for conditions such as average CPU load average during the execution of the query or other parameters. Multiple graphs can be combined to compare performance under multiple conditions, for example including aspects of one or more of cardinality, memory availability, CPU load average, average disk busy, and the like. A similar visualization can be created for atomic queries. In addition, the map is annotated to reflect how frequently particular conditions occur. The smaller rectangle marks the region of the most frequently occurring conditions. The larger rectangle marks a region of conditions that occur with 10% probability. Any number of other visualization techniques can be applied to capture the information. For example, the map can be annotated to mark a region of anticipated conditions under which the query is expected to execute.

Figure 6B:
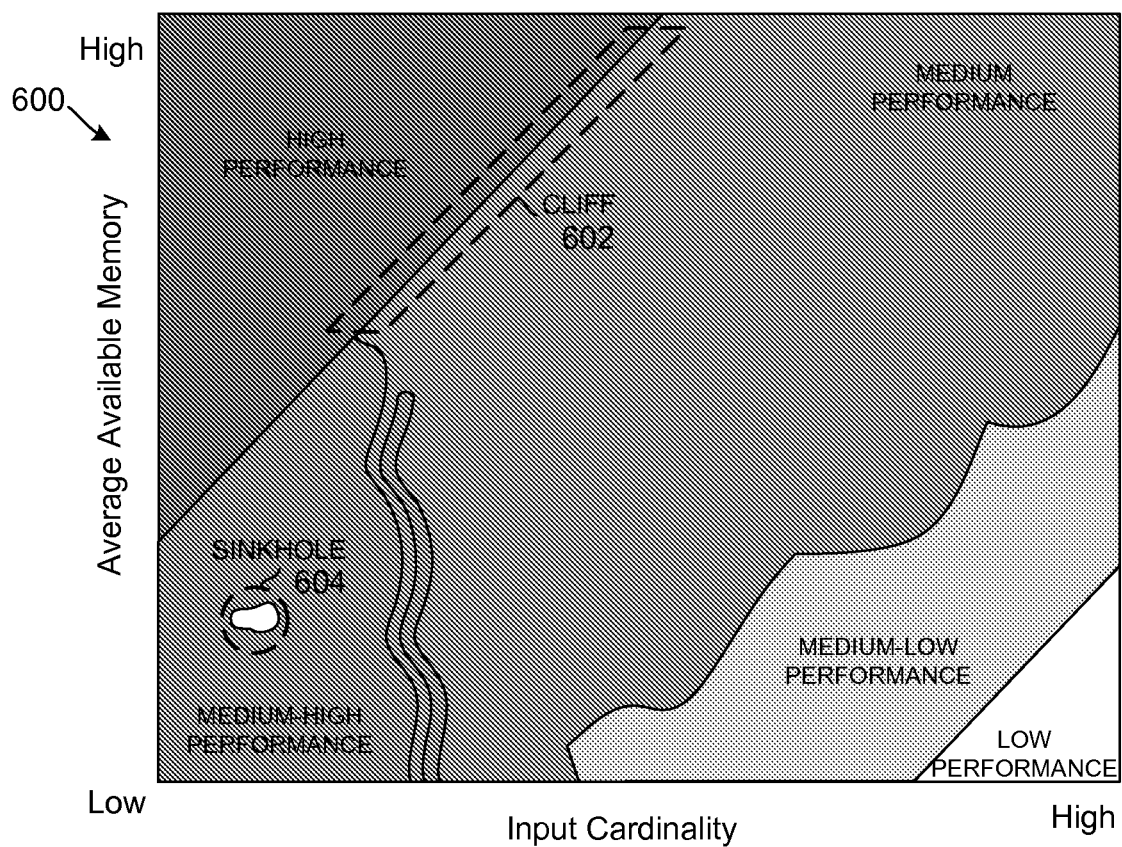

"Robustness" is defined herein as a measure of continuity of the curvature of the function describing performance under varying conditions. FIG. 6B shows how "interesting features" can be marked on the map 600. In an example application, areas of interest such as edges and holes where the target query plan's performance drops off precipitously when compared to the best alternative. Thus, where performance does not degrade gracefully. For example, the circled area labeled "cliff" 602 shows where performance suddenly degrades when a particular ratio of input size of the input to the amount of memory available is exceeded. The map 600 can accommodate any number of other types of features.

In addition, performance can generally be expected to be a monotonic function. For example performance steadily degrades as the amount of data grows and as the amount of available memory decreases. The maps can therefore also note areas where performance is other than monotonic. Thus, the circled area labeled "cliff" can note the coordinates of an area where throughput drops off sharply. Similarly, the circled area labeled "sinkhole" marks a small range of memory and input cardinality values for which throughput drops off sharply, only to resume expected levels of throughput upon exiting the area. Such a robustness map can accommodate any number of other types of features.

A query statement can be executed in many different ways, for example full table scans, index scans, nested loops, hash joins, and others. A query optimizer is a component of a database management system that attempts to determine the most efficient way to execute a query. The query optimizer determines the most efficient way to execute a SQL statement after considering many factors related to the objects referenced and the conditions specified in the query. The determination is a useful step in the processing of any query statement and can greatly affect execution time.

The query optimizer compares the available query plans for a target input query and estimates which of plan will be the most efficient in practice. One type of query optimizer operates on a cost basis and assigns an estimated cost to each possible query plan, for example selecting the plan with the smallest cost. Costs can be used to estimate the runtime cost of evaluating the query in terms of factors such as the number of I/O operations required, processor load requirements, and other factors which can be set forth in a data structure called a data dictionary which stores statistics used by the query optimizer. The set of available query plans that are examined is formed by examining the possible access paths, such as index scan and sequential scan, and join algorithms including sort-merge join, hash join, nested loops, and others. A search space can become very large according to complexity of the query.

Considering that performance of a database system during processing of a query depends on the ability of a query optimizer to select an appropriate plan for executing the query under an expected set of conditions (for example, cardinality estimates, resource availability assumptions), and the ability of an executor to process the query using the selected plan under actual runtime conditions, a challenge arises that actual runtime conditions can differ significantly from what is expected, particularly in situations where multiple queries execute simultaneously. For example, data skew can cause cardinality to exceed expectations by multiple orders of magnitude, or an unexpectedly heavyweight query can monopolize memory, leaving only a fraction of expected memory available. In a worst case, actual runtime conditions can be so adverse that the selected query plan can potentially be the worst, as opposed to the best, plan for the given conditions.

In addition, database operator implementations are typically tested to verify performance at specific points, as opposed to tested in terms of the continuity of performance degradation over a large range of conditions. Thus, performance can suddenly degrade dramatically and unexpectedly with only a minor change in conditions. Accordingly, the system 100 depicted in FIG. 1 and associated functionality, by creating a map of performance under a large range of conditions, enables the prediction and analysis of such performance degradation.

The robustness maps in FIGS. 6A and 6B can be analyzed to detect a condition in which performance improves as work increases or as resources decrease, an indication of drastically incorrect operation since inherent in proper operation is that database performance degrades with increased work and fewer resources. One example of such incorrect operation is shown as the sinkhole 604 in FIGS. 6A and 6B. In a two-dimensional visualization of absolute performance, incorrect operation can be visualized as lines that slant downward, then upward. (In contrast, in robustness maps for which performance is shown relative to best performance, such behavior is not indicative of incorrect behavior.)

Figure 6C:
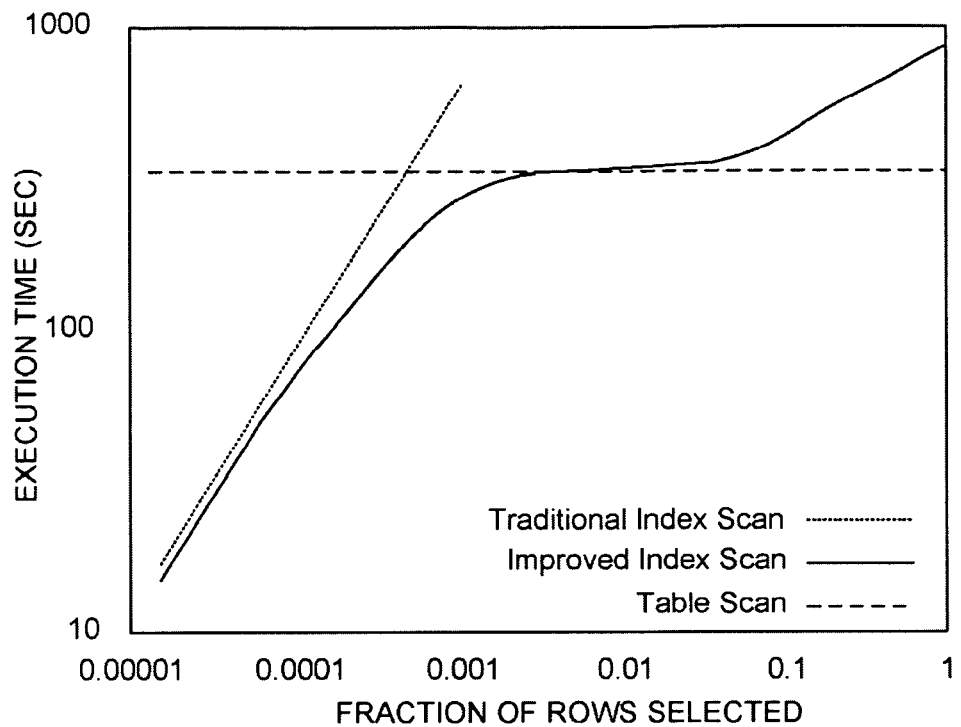

Referring to FIG. 6C, a diagram illustrates an example of a two-dimensional parameter space robustness table with single-table, single-predicate selection and shows execution times for selecting rows from a table (Transaction Processing Performance Council (TPC-H) benchmark line items, about 60M rows) for a variety of selectivities (result sizes). Selectivities and execution times both are shown with logarithmic scales. Query result sizes differ by a factor of two between data points. FIG. 6C shows performance of three query execution plans. One plan is a traditional table scan with performance constant across the entire range of selectivities. For small result sizes, the table scan is unacceptably slow compared to the index scans. A second plan is a traditional index scan, which is unacceptably slow for moderate and large result sizes due to the need to fetch qualifying rows from the table. Cost of the index scan is so high that showing the entire range of selectivities is not possible. The break-even point between table scan and traditional index scan is at about 30K result rows or $2^{-11}$ of the rows in the table. A third plan is an improved index scan which combines low latency for small results as well as high bandwidth for moderate result sizes. The cost of the improved index scan remains competitive with the table scan all the way up to about 4M result rows or $2^{-4}$ of the rows in the table. However, the improved index scan, despite improvement over the traditional index scan, has performance that is poor for large results. If all rows in the table satisfy the query predicate, the performance of the improved index scan is about 2½ times worse than a table scan. While a factor of 2½ is undesirable, cost is much less than cost of a traditional index scan which would exceed the cost of a table scan by multiple orders of magnitude.

An optimistic insight from FIG. 6C is that robust execution seems possible. A pessimistic insight is that the improved index scan as implemented in the system is not yet sufficiently robust. One perspective view is that a single query execution plan might eventually be superior or at least competitive across the entire range so that an erroneous choice during compile-time query optimization can be avoided by eliminating selection among alternatives. Another perspective view is that the query execution engine has not yet reached a sufficient level of sophistication and robustness. Considering the simple techniques that underlie the "improved" plan in FIG. 6C, appropriate run-time techniques can be used based on the usage of robustness maps analysis.

Although FIG. 6C can enable observations, insights, and perspective on a research effort, other visualizations enable additional insights into additional aspects of robustness and are helpful for individual operations such as index scans and for plan fragments such as scans of multiple indexes combined by index intersection. Visual images greatly assist in identifying poor scalability or robustness, discontinuities in actual execution costs, and the like. Thus, the further visualizations help in analyzing and reasoning about query execution algorithms, implementations, entire query execution plans or fragments thereof, and the query execution architecture.

The visualizations can be employed by database software vendors to target improvements in query execution, indexing techniques, and query optimization. The visualizations can be used by database administrators to analyze specific query execution plans to address unsatisfactory performance or robustness of query execution. Various visualizations have been found particularly helpful and are disclosed herein.

FIG. 6C is an example of a simple visualization of performance and robustness. One aspect of performance that can be verified by the two-dimensional diagram is that the actual execution cost is monotonic across the parameter space. For example, fetching of rows is expected to become more expensive with additional rows. If cases exist in which fetching more rows is cheaper than fetching fewer rows, some aspect of performance is anomalous. For example, the governing policy or some implementation mechanisms might be faulty in the algorithms that switch to pre-fetching large pages instead of fetching individual pages as needed. Moreover, the cost curve is expected to flatten, wherein the first derivative of the cost curve should monotonically decrease. Fetching more rows should cost more, but the difference between fetching 100 and 200 rows should not be greater than between fetching 1,000 and 1,100 rows, a condition that is not true for the improved index scan shown in FIG. 6C since the curve for the improved index scan shows a flat cost growth followed by a steeper cost growth for very large result sizes.

Figure 6D:
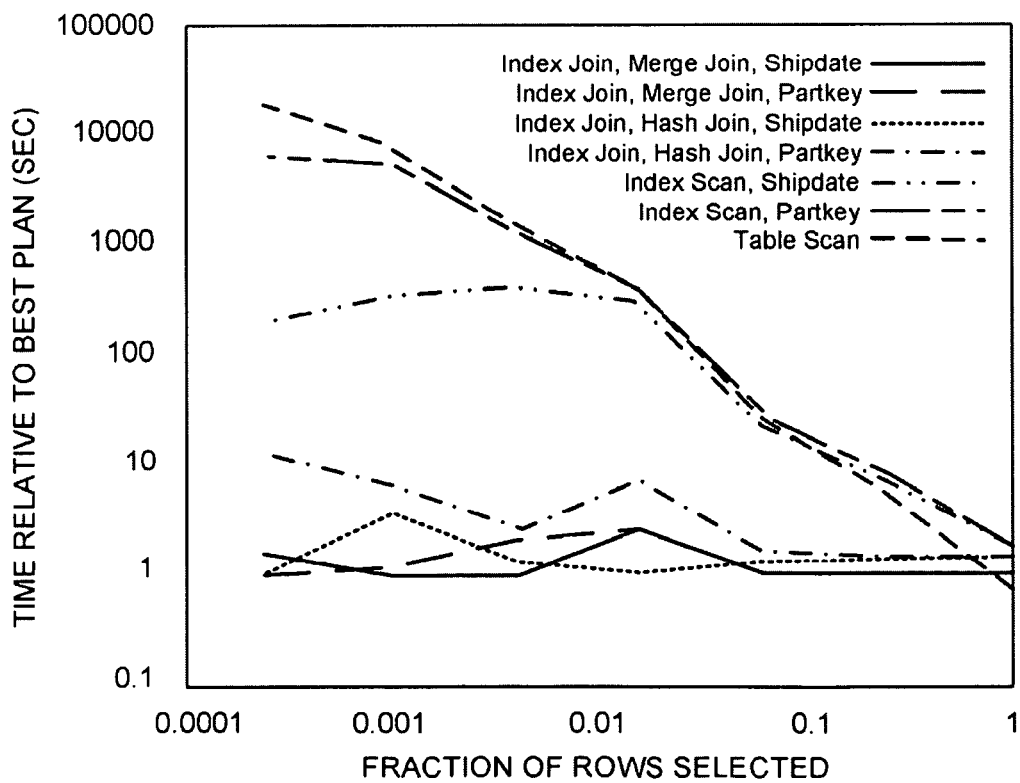

FIG. 6D is a diagram showing performance of plans for a simple query similar to the query of FIG. 6C, with two differences. First, performance is shown not in absolute times but relative to the best plan for each point in the parameter space. This type of diagram is most appropriate if the absolute performance varies very widely across the parameter space. In FIG. 6C for example, the left-most data point still represents an output size of about 900 rows ($60M \times 2^{-16}$). Even with a logarithmic scale for query execution costs, extending the diagram all the way to one output row would increase diagram height or reduce vertical resolution by a factor of 2½. Illustrating the relative performance of all plans may permit better resolution and better use of the space available for a diagram. Second, additional query execution plans are included, specifically multi-index plans that join non-clustered indexes such that the join result covers the query even if no single non-clustered index does. These index joins are performed by alternative join algorithms and using alternative join orders.

When comparing query execution plans for a given query, analysis includes determination of which classes of query execution plans to include such as: (1) only plans actually considered by the system under investigation; (2) plans that could be forced by some means or other including alternative syntax (for example, index intersection by means of multiple query aliases for the same database table); (3) plans that could be enabled only by an alternative database design (such as two-column indexes); or (4) plans that could be realized only with additional implementation effort by the software vendor (such as bitmap indexes, bitmap-driven sorting or intersection). Actual execution costs for the fourth class might be obtained through experiments using a competing database system that is more advanced in specific query execution techniques. The most appropriate class choice depends on whether design and future improvements of system components can be selected. For example, plans enabled by alternative syntax can considered if influence over the rewrite capabilities in the query optimization steps is available.

The diagrams can be implemented using either linear or logarithmic scales. Logarithmic scales on both axes permit reasonably detailed insight at both ends of the spectrum of possible parameter values. Curves can be formed to indicate absolute performance or performance relative to the best plan for any one point in the parameter space, where the definition for "best" might include any of the classes of query execution plans.

Robustness maps can also display performance in three-dimensional parameter spaces. Limitation to a single dimension within the parameter space both focuses and limits the insights. The interaction of dimensions can also be considered. The number of possible parameters may be very high, including multiple formal query parameters with run-time bindings; resource availability such as memory, processing bandwidth, I/O bandwidth, and interconnection bandwidth; and intermediate result sizes due to predicates (selection, joins), aggregation (projection, duplicate removal), and set operations (intersection, union, difference). Visualization practically forces consideration of two dimensions at a time and rotation through pairs of dimensions.

System tests can use various performance map visualizations to compare performance of an operator or query component to best performance. For example, referring to FIGS. 6C and 6D, performance is shown compared to best possible performance. FIGS. 6C and 6D show measurements resulting from execution of many different methods. For example, as depicted in FIG. 4C, an performance of an index scan is shown compared to the table scan which is the best performing plan at the end of the graph where selectivity is 1, and an improved index scan which has a much higher execution time and lower performance. The traditional index scan (fine dotted line) has an execution time that extends off the page so that improvements may be sought to attain better performance. At a cross-over point, the table scan (dashed line) performance meets the traditional index scan (dotted line) so that the traditional scan (dotted line) rapidly and substantially degrades in comparison to the table scan (dashed line). Both the table scan and the traditional index scan perform the same task, but the traditional index scan performs scanning much less efficiently after the cross-over point. Thus, improvements may be sought in the region after the cross-over, for which the degraded performance of the traditional index scan may result from, for example, memory overflow. Improvements may be sought to attain performance similar to the improved index scan (solid line).

Figure 6E:
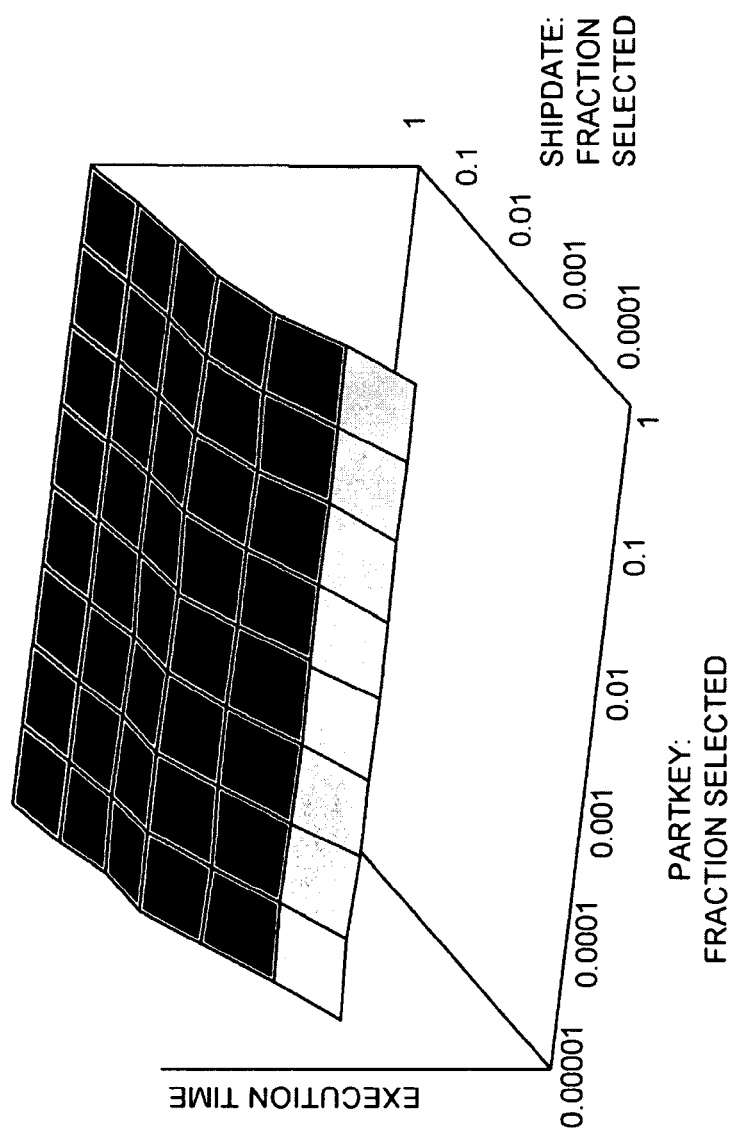

Referring to FIG. 6E, a three-dimensional map is shown which displays a parameter, illustratively execution time, in grayscale-coding or color-coding. The mapping shows elapsed times in colors or monochrome shades from green to red and finally black (light gray to black in monochrome) with each color or shade difference indicating an order of magnitude. FIG. 6E illustrates two-predicate, single-index selection, showing the execution cost for a query restricting two columns of a table. The query execution plan scans a single-column index and applies the second predicate only after fetching entire rows from the table's main storage structure. The two dimensions shown are the selectivities of the two predicate clauses. The third dimension is execution time, ranging from 4 seconds to 890 seconds.

As shown in FIG. 6E, the two dimensions have very different effects. In fact, one of the predicates appears to have practically no effect at all wherein the predicate can be evaluated only after fetching entire rows—a result which is predictable because index scans perform as expected and as coded in the cost calculations during query optimization. The actual behavior meets the anticipated behavior (reflected correctly in the cost function used during query optimization). FIG. 6E shows the robust query execution technology from FIG. 6C. While barely visible in FIG. 6E, FIG. 6C illustrates robustness very succinctly, demonstrating the value of visualizations using a combination of one-dimensional and two-dimensional parameter spaces.

Figure 6F:
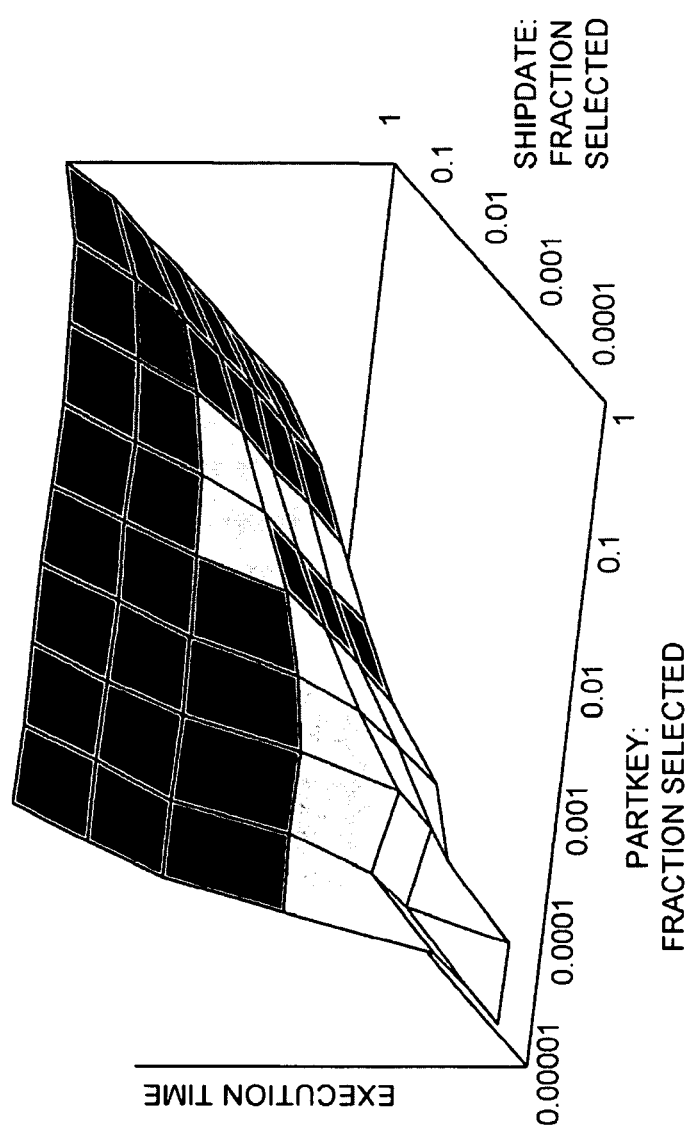

Referring to FIG. 6F, a three-dimensional diagram illustrates operation of a two-index merge join, and shows the execution cost for an alternative query execution plan, specifically scans of two single-column non-clustered indexes combined by a merge join. Other than some measurement flukes in the sub-second range (front left, green), the symmetry in the diagram indicates that the two dimensions have very similar effects. Hash join plans perform better in some cases but do not exhibit symmetry.

Figure 6G:
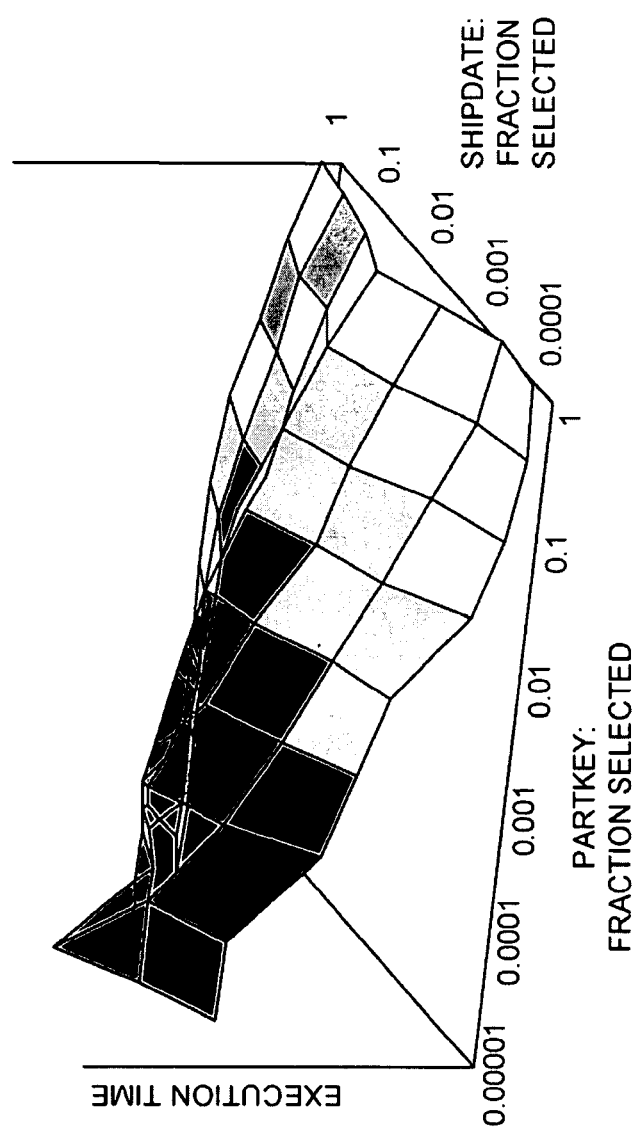

In addition to the two plans depicted in FIGS. 6E and 6F, FIG. 6G illustrates a map acquired by running five additional alternative query execution plans for the simple query. The query execution plans include a no-index table scan (actually, scanning a clustered index organized on an entirely unrelated column), a plan using a single-column non-clustered index for the other predicate clause, and three other plans combining two single-column non-clustered indexes (using merge join or hash join each in two join orders). The relative performance of each individual plan is plotted compared to the optimal plan at each point in the parameter space. A given plan is optimal if performance is equal to the optimal performance among all plans, so that the quotient of costs is 1. A plan is sub-optimal if the quotient is much higher than 1.

Referring to FIG. 6G, a three-dimensional diagram depicts performance of a single-index can relative to the best of seven plans. FIG. 6G shows the same data as FIG. 6E with performance indicated in terms of the relative difference to the best plan at each point. The diagram enables immediate recognition that the plan is optimal only in a small part of the parameter space. Moreover, the region is not continuous. While the absolute performance shown in FIG. 6E is fairly smooth, the relative performance shown in FIG. 6G is not smooth indicating that the costs of best plans are not smooth. In the example, the maximal difference is a factor of 101,000. Thus, while the plan is optimal in some regions of the parameter space, the worst relative performance is so poor that disruption of data center operation is likely.

Figure 6H:
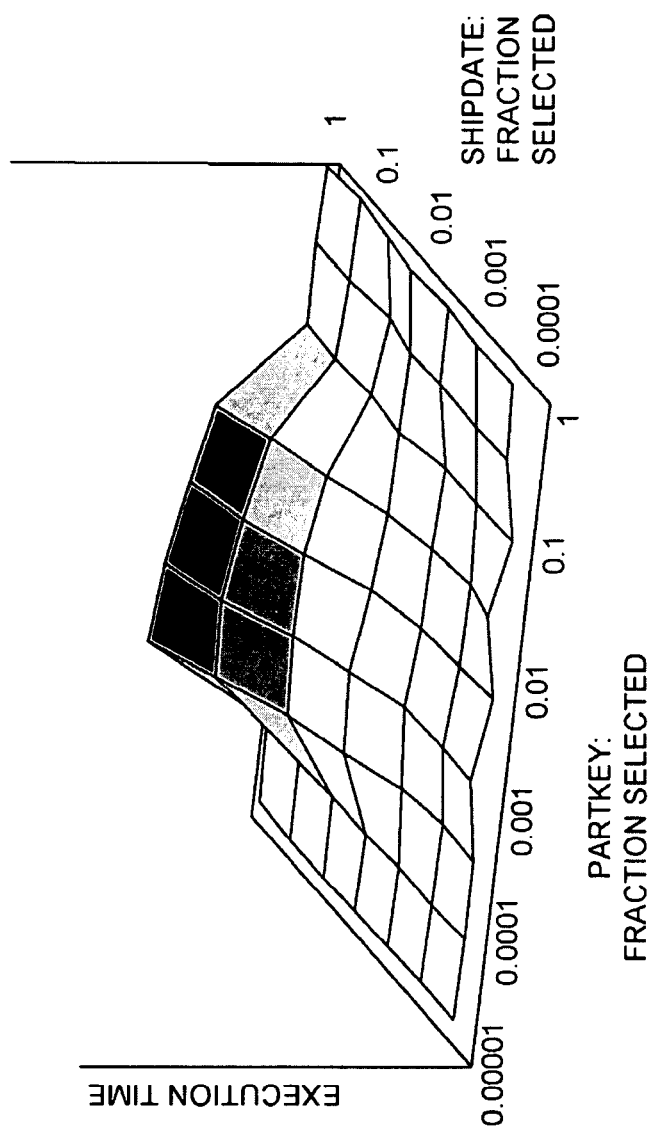

Referring to FIG. 6H, a three-dimensional diagram illustrates relative performance of a system using a two-column index, depicting the relative performance of a plan with a covering two-column index in an a software system different from that analyzed with respect to FIG. 6G. Due to multi-version concurrency control applied only to rows in the main table, the plan involves fetching full rows. In other words, the space overhead of multi-version concurrency control seems to have forced the developers of the system to apply concurrency control only to rows in the main representation of the table. Thus, the advantages of covering non-clustered indexes, including joins of multiple non-clustered indexes are disabled.

In the query execution plan, rows to be fetched are sorted very efficiently using a bitmap. The plan is close to optimal in this system over a much larger region of the parameter space. Moreover, the plan's worst quotient is not as bad as that of the prior plan shown in FIG. 6G. Thus, if the actual value of parameters is not known at compile-time, the plan is probably much more desirable even if the plans of FIG. 6E and FIG. 6F are judged more efficient at compile-time based on anticipated predicate selectivities. Thus, robustness might well trump performance in those situations.

Figure 6I:
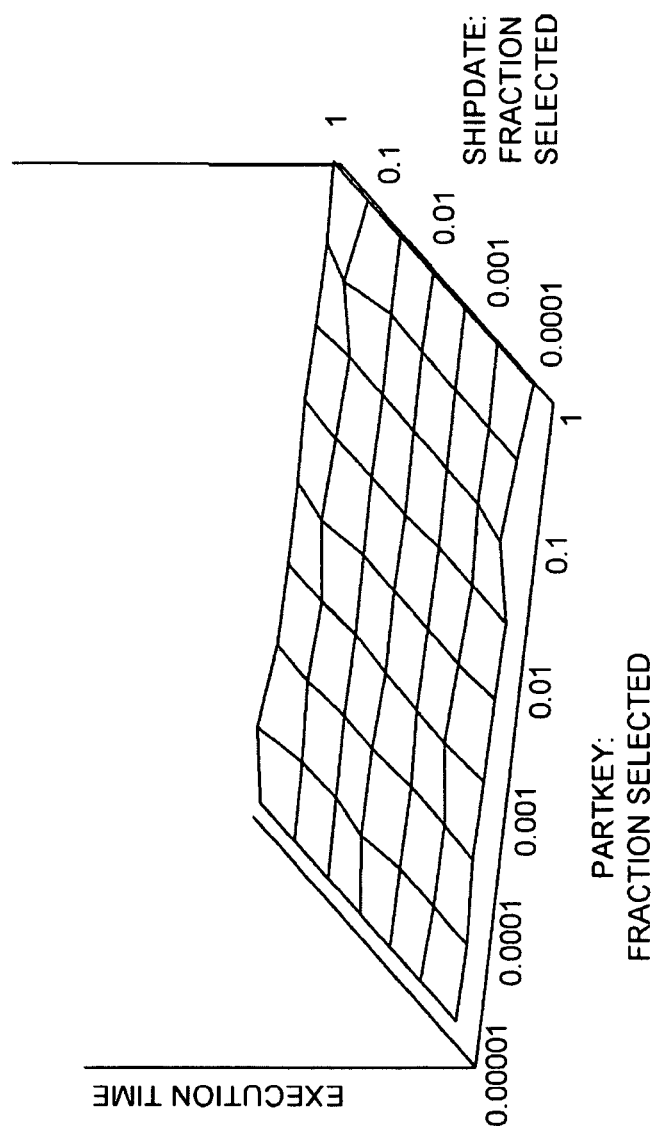

Referring to FIG. 6I, a three-dimensional robustness map shows the most robust plan in a third system. Relative performance is good across the entire parameter space, albeit not optimal. The foundation of consistent performance is a sophisticated scan for multi-column indexes described as multi-dimensional B-tree access. Data points indicate that the plan is the best query execution plan (indicated by a cost factor 1 or a light green color or light monochrome shade).

The visualization techniques employed to form the diagrams enable rapid verification of expected performance, testing of hypotheses, and insight into absolute and relative performance of alternative query execution plans. For even a very simple query, a plethora of query execution plans can be used. Investigating many plans over a parameter space with multiple dimensions is possible only with efficient visualizations.

Other robustness maps can be created to analyze other aspects of performance. For example, worst performance can be mapped to detect particularly dangerous plans and relative performance of plans compared to worst possible performance. In addition, multiple systems and available plans can be compared in combination.

Other software development activities can be performed on the basis of the visualizations. For example, a developer can focus on improving the performance of the best plan at some points deemed important within the parameter space—a traditional focus on achievable performance. Also, a developer can focus on performance of the plan with the broadest region of acceptable performance and then improve performance in the regions of the parameter space where the plan's performance is poor—a focus on robustness of a specific plan and, if that plan is chosen during query optimization, on robustness of query processing as a whole.

Another robustness map visualization is a single map showing all possible query execution plans, indicating the best plan for each point and region in the parameter space, perhaps using a color for each plan. One aspect of the map can be the size and the shape of each plan's optimality region. The regions can be continuous, simple shapes.

For query execution, analysis can focus on irregular shapes of optimality regions. Often, some implementation idiosyncrasy rather than the algorithm can cause the irregular shape. Removal of such idiosyncrasies may lead to more efficient as well as more robust query execution.

Some techniques can enlarge the largest region, possibly even eliminating some smaller regions and thus some plans from the map of optimality. Every plan eliminated from the map implies that query analysis need not consider the eliminated plan. Reducing the plan space in query analysis contributes to the robustness.

Figure 6J:
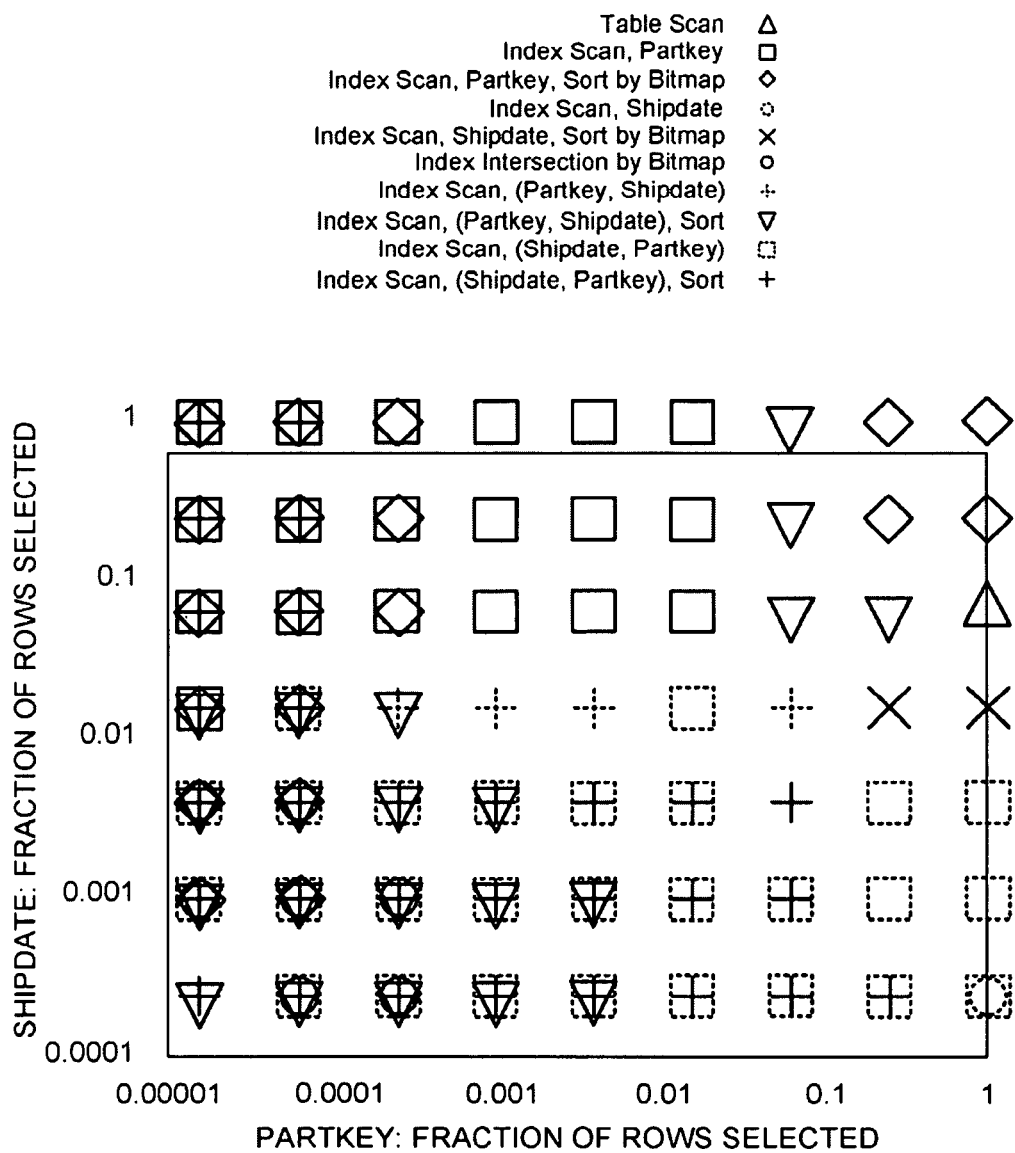

Referring to FIG. 6J, a diagram, shows mapping of regions of optimality. Most points in the parameter space have multiple optimal plans (within 0.1 sec measurement error). In fact, when analyzing optimality, all small differences should be neglected. For example, two plans with actual execution costs within 1% of each other are practically equivalent. Whether the tolerance ends at 1% difference, at 20% difference, or at a factor of 2 depends on a tradeoff between performance and robustness, and thus the tradeoff between the expense of system resources and the expense of human effort for tuning and problem resolution.

Variants of FIG. 6H and FIG. 6I can be used to show the region of optimality for a specific plan. Since the number of plans that may cover any one point in the parameter space is large, shading using two colors is typically not sufficient, but a diagram with points shaded in a large number of colors seems more confusing than illuminating. Thus, this type of diagram inherently requires one diagram per plan and thus many diagrams.

FIGS. 6K(1) and 6K(2) illustrate robustness maps for two-predicate index scan implementations. Robustness maps are designed to quantify and visualize how performance degrades as work increases and resources decrease. A plan or operator under test is fixed and performance is measured while forcing execution across a spectrum of conditions with results then plotted in a Euclidean space. The resulting shape illustrates performance degradation patterns. Slope indicates how quickly performance degrades, while curvature indicates how predictably performance degrades. Areas where the rate of performance rapidly and unpredictably drops are manifest. For example, FIGS. 6K(1) and 6K(2) compare three-dimensional robustness maps for two different implementations of a given operator, charting performance of an index scan while varying the selectivity of two predicates. Other robustness maps can be used to show how a given plan's performance compares to that of the best plan. Although only two- and three-dimensional maps are depicted herein, the technique can be used with any metric space.

Robustness maps enable analysis and reasoning about the executor's impact on query robustness. By making visible where and how performance changes, the maps show developers and regression testers the circumstances under which performance is particularly sensitive to small deviations from expected conditions. Developers can then address this sensitivity. Robustness maps thus enable a different view of performance than tests that focus on pure execution time or throughput. Robustness maps enable motivation, tracking, and protection of improvements in query execution by providing a concrete and intuitive "big picture" of the performance landscape.

The robustness map approach can be tested by building robustness maps for simple queries from the TPC-H benchmark. All database instances can be loaded with the same line item table, using the same rows (in the same order). A scale factor 10 instance of TPC-H can be used resulting, for example, in 60M rows (6 GB). In an example analysis, five indexes are built upon the table including a default clustered index on the primary key, two single column indexes on the query predicate columns, and a pair of two-column indexes on the query predicate columns. A selected number of maps are constructed and analyzed for the three systems. For example, FIGS. 6K(1,2) show that one implementation of index nested loops join is more resilient than another to variance in input data sizes, a graceful degradation that may result from the first implementation's efficient sort operation.

Figure 6L:
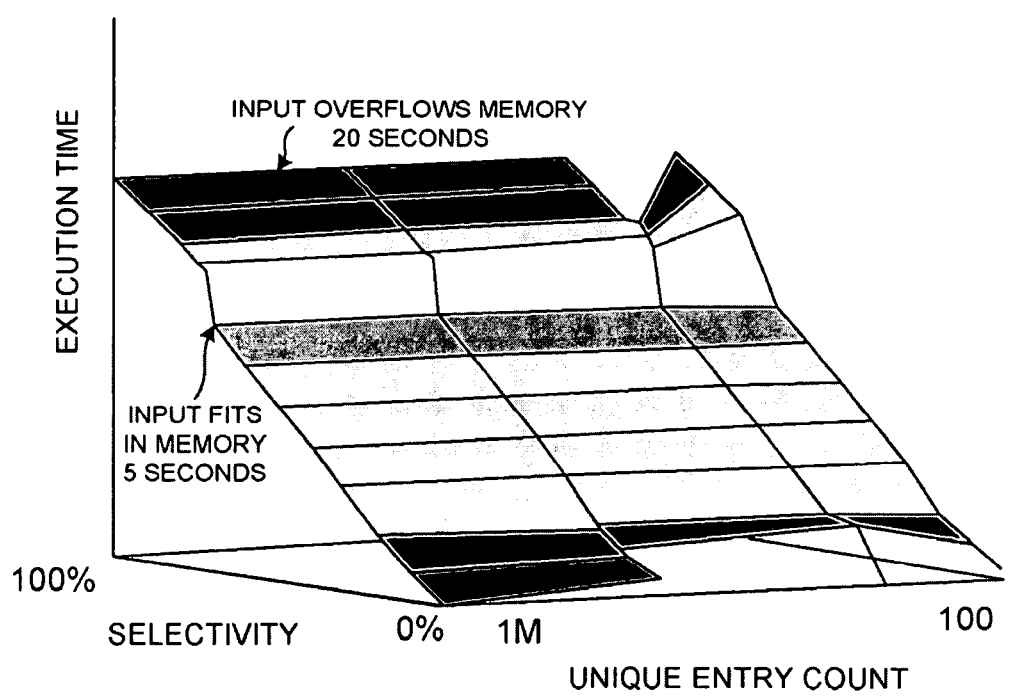

Thus robustness maps can be used to evaluate the robustness of a sort operator. FIG. 6L shows a three-dimensional robustness map comparing the relative performance of the sort operator while varying selectivity and duplicate values. A dramatic drop in performance occurs when the data input no longer fits in memory. If estimated selectivity were one row short of the amount that would fit into memory, and the actual data size only two rows more, the sort operation would take nearly five times longer than expected.

Figure 6M:
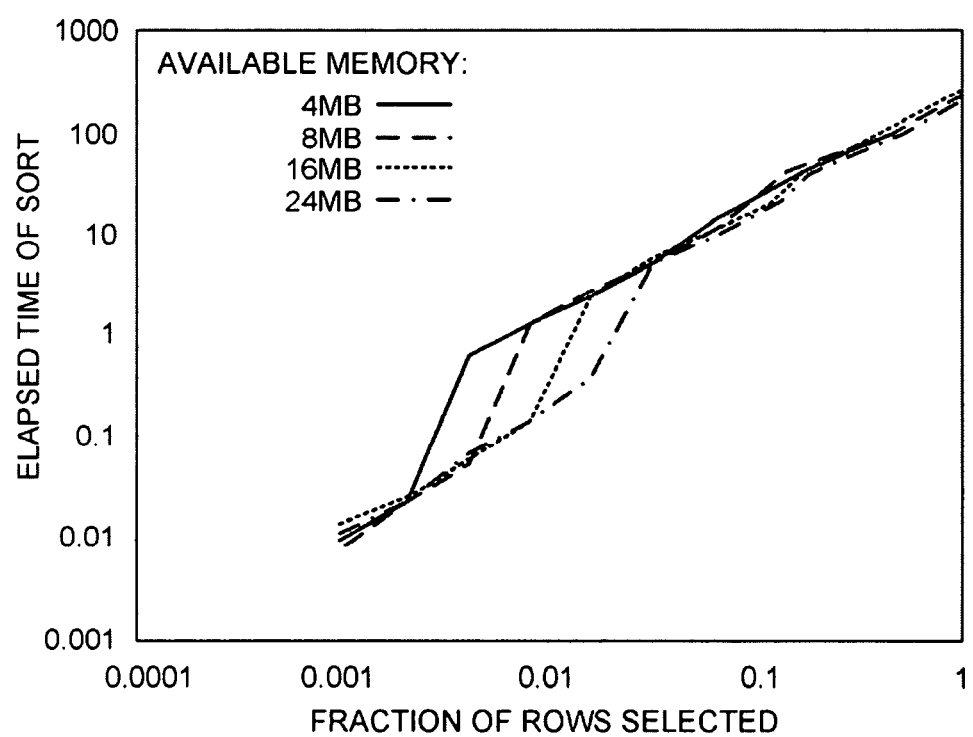

Although such a performance drop or cliff could be considered easily anticipated, since memory availability and cardinality estimates can be checked at compile-time, when the plan is selected. However, a query optimizer bases cost estimates for a sort operation on the amount of configured memory and initial cardinality estimates, both of which are subject to significant change from compile time to run-time. Resource contention can reduce the amount of available memory to a small fraction of that anticipated. Multiple levels of intermediate results can compound that impact. FIG. 6M maps how performance degrades as available memory decreases and shows how memory contention changes the location of the critical point where a small increase in data size causes a major drop in performance.

System tests can use various performance map visualizations for identifying anomalies. For example, referring to FIGS. 6L and 6M, anomalies are shown wherein input that overflows memory by even the slightest amount results in a substantial (for example, 15 second or more) penalty in execution time. The performance maps show anomalies that occur for one particular operator on one particular query running on one particular system. Test procedures analyze the performance maps to identify such anomalies. For example, to identify unexpected jumps shown in FIGS. 6L and 6M, the test procedure analyzes the degree of curvature between data points.

Run-time performance of any query plan can vary dramatically depending on execution conditions such as actual predicate selectivity and contention for memory and other resources. Execution conditions vary unpredictably, leading to the unexpectedly long-running queries that plague database users and administrators today. Thus, robust query processing reduces cost of ownership by reducing the need for human intervention.

In general, robustness in database query processing can be improved by modifications in query optimization, query execution, workload management, and other components. The systems and techniques disclosed herein focus on query execution. Robustness maps can be used to visualize performance of query execution algorithms and plan fragments, enabling understanding of behavior across a wide range of unexpected situations.

Various visualization techniques reveal different insights. Robustness maps with two- and three-dimensional parameter spaces are introduced, including discussion of robustness map interpretation, a demonstration of how to detect landmarks that appear on the maps, and a discussion of implications for robustness.

Visualizing the performance of specific algorithms, associated implementations, and plan fragments using the algorithms enables analysis of strengths and weaknesses. Adaptive techniques during run-time query execution can have as great an impact on robust query processing as plan choices during compile-time query optimization. Adaptive run-time techniques pertain to data volumes, resource availability including memory, and the specifics of the memory hierarchy.

Robustness map analysis and its visualization can be extended to additional query execution algorithms including sort, aggregation, join algorithms, and join order. For example, some implementations of sorting spill their entire input to disk if the input size exceeds the memory size by merely a single record. Those sort implementations lacking graceful degradation will show discontinuous execution costs. Other resources may introduce similar effect, such as a sort input exceeding the size of the CPU cache or the size of flash memory.

Robustness maps enable visualizations of entire query execution plans including parallel plans. A benchmark can be defined that focuses on robustness of query execution and, more generally, of query processing. The benchmark can be used to identify weaknesses in the algorithms and implementations, track progress against weaknesses, and permit daily regression testing to protect the progress against accidental regression due to other, seemingly unrelated, software changes.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-implemented method comprising:
    receiving a robustness map, wherein:
        the robustness map shows a measure of continuity of a curvature of a function, wherein the function describes how actual database performance of a first database query plan for a database query relative to a second database query plan for the database query varies under a set of runtime conditions;
    identifying a set of robustness bugs from the robustness map;
    prioritizing regression testing of the set of robustness bugs using the robustness map to produce a set of prioritized robustness bugs reflected within the robustness map;
    performing regression testing according to the regression testing using the robustness map, wherein:
        the regression testing operates on the set of prioritized robustness bugs reflected within the robustness map, wherein each robustness bug of the set of prioritized robustness bugs occurs under specific runtime conditions; and
    allocating resources to fix the set of prioritized robustness bugs based on results of the regression testing.

2. A computer-implemented method as in claim 1, additionally comprising:
    characterizing severity of each robustness bug of the set of robustness bugs in terms of amplitude of performance degradation, range of condition span for which the robustness bug is present, and frequency with which robustness bug conditions are historically encountered or expected to be encountered.

3. A computer-implemented method as in claim 1 further comprising:
    characterizing severity of each robustness bug of the set of robustness bugs in terms of degree to which performance degradation can be remedied, estimation of the resources expended to correct the robustness bug, and assessment of risk associated with an action that corrects the robustness bug.

4. A computer implemented method comprising:
    receiving a robustness map, wherein the robustness map represents a measure of continuity of a curvature of a particular function, the particular function describing how a database system performance of a first database query plan for a query varies relative to a second database query plan for the query based on variation of runtime conditions over a predetermined range of runtime conditions;
    testing the database system performance on a subset of the predetermined range of runtime conditions based on a location and a migration of a landmark on the robustness map, wherein:
        the landmark indicates a specific runtime condition within the predetermined range of runtime conditions under which the database system performance experiences degradation that exceeds a predetermined expected database system performance degradation at the specific runtime condition; and
    allocating resources to fix one or more robustness bugs based on results of the testing.

5. A computer-implemented method as in claim 4 further comprising:
    evaluating robustness of a specified database system implementation in terms of degree of robustness exhibited when executing a predetermined database benchmark.

6. A computer-implemented method as in claim 4 further comprising:
    analyzing measurements and landmarks in the robustness map; and
    using the analysis of measurements and landmarks in the robustness map to perform regression tests evaluating robustness of a database engine's operator implementations.

7. A computer-implemented method as in claim 4 further comprising:
    evaluating robustness of a specified database system implementation in terms of robustness of operation implementations.

8. A computer-implemented method as in claim 4 wherein testing the database system performance comprises:
    visualizing location and character of performance changes in the database system performance on the robustness map wherein the robustness map is analyzed to detect circumstances under which the database system performance is sensitive to deviations from expected behavior; and identifying performance anomalies.

9. A computer-implemented method as in claim 4 further comprising:

detecting a performance degradation by determining curvature between data points on the robustness map, comprising:

identifying locations on the robustness map wherein the database system performance degrades by a predetermined amount or the database system performance degrades in a manner different from a predetermined expected manner; and, applying a corrective action according to the identified locations of database system performance degradation.

10. A computer-implemented method as in claim 4 wherein the second database query plan corresponds to a best known query plan for the query.

11. A computer-implemented method as in claim 4 further comprising:

using the robustness map to detect an error condition wherein the database system performance improves as workload increases or operating resources decrease.

12. A non-transitory computer-readable medium on which is stored programming code which when executed on a computer system performs a method comprising:

receiving a robustness map, wherein the robustness map represents a measure of continuity of a curvature of a particular function, wherein the particular function describes how measured database system performance of a first database query plan for a database query varies relative to a second database query plan for the database query during a predetermined range of runtime conditions;

using information from the robustness map to prioritize regression testing to determine a prioritized set of robustness bugs;

performing regression testing on the prioritized set of robustness bugs, wherein each robustness bug of the prioritized set of robustness bugs occurs under specific runtime conditions where the measured database system performance experiences a performance degradation that exceeds a predetermined expected performance degradation at the specific runtime conditions; and allocating resources to fix the prioritized set of robustness bugs based on results of the regression testing.

13. The non-transitory computer-readable medium as in claim 12 wherein the method further comprises:

characterizing severity of each robustness bug of the prioritized set of robustness bugs in terms of amplitude of the performance degradation, range of conditions span for which the robustness bug is present, frequency with which robustness bug conditions are historically encountered or expected to be encountered, degree to which the performance degradation can be remedied, estimation of the resources expended to correct the robustness bug, and assessment of risk associated with an action that corrects the robustness bug.

14. The non-transitory computer-readable medium of claim 12, wherein a robustness bug of the prioritized set of robustness bugs describes conditions under which a specific implementation of a database operator or atomic query component suddenly degrades.

15. The computer-implemented method of claim 1, wherein locations and migrations of robustness bugs of the prioritized set of robustness bugs on the robustness map determine areas subject to regression testing.

16. The computer-implemented method of claim 1, wherein the second database query plan corresponds to an optimal database query plan at a first runtime condition in the set of runtime conditions.

17. The computer-implemented method of claim 1, wherein the function is represented as a single curve in the robustness map.

18. A computer-implemented method as in claim 4, wherein the particular function is represented as a single curve in the robustness map.

19. The non-transitory computer-readable medium of claim 12, wherein the second database query plan corresponds to an optimal database query plan at a first runtime condition in the predetermined range of runtime conditions.

20. The non-transitory computer-readable medium of claim 12, wherein the particular function is represented as a single curve in the robustness map.

* * * * *